UNITED STATES PATENT OFFICE.

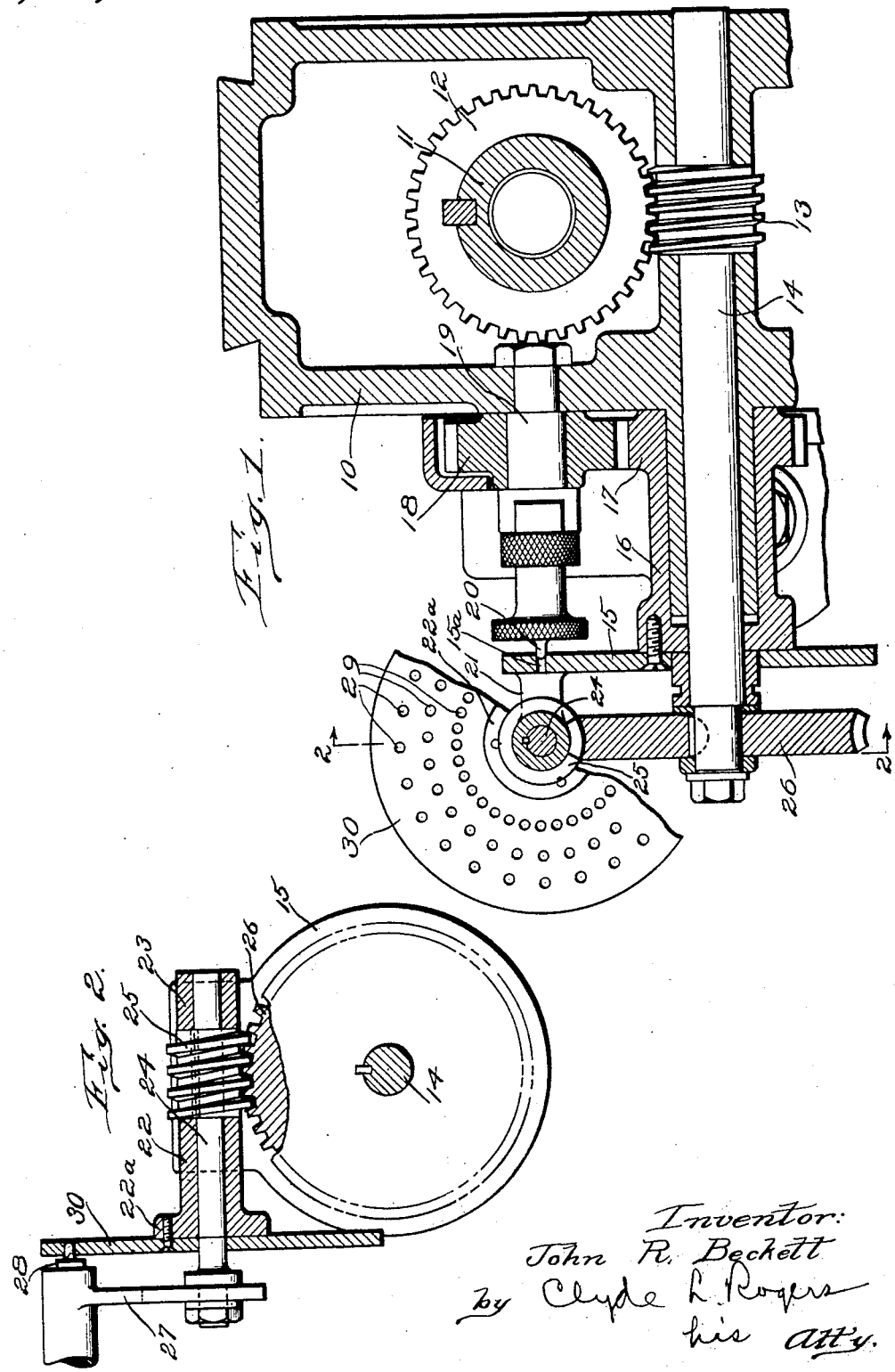

JOHN R. BECKETT, OF SOMERVILLE, MASSACHUSETTS.

INDEXING DEVICE.

1,387,756.  Specification of Letters Patent.  Patented Aug. 16, 1921.

Application filed May 16, 1919. Serial No. 297,702.

*To all whom it may concern:*

Be it known that I, JOHN R. BECKETT, a citizen of the United States, and resident of Somerville, county of Middlesex, Commonwealth of Massachusetts, have invented an Improvement in Indexing Devices, of which the following description, in connection with the accompanying drawings, is a specification, like characters on the drawings representing like parts in each of the several views.

This invention relates to indexing devices and more particularly to index heads as employed on metal working machines such as milling and gear-cutting machines. In index heads as commonly constructed, it has not been practicable to index closely and accurately fine work requiring great precision for the reason that the possibilities of adjustable setting have been limited by the number of holes it was possible to produce in the index plate for receiving the pin of the index arm. Certain expedients have been proposed for adjustments in the indexing to extend the range provided by the ordinary perforated index plate, but so far as known to me, these have not been adapted for definite predetermined adjustment, nor have they been of a character capable of manipulation except with the use of tools and some special attention.

The principal object of the present invention is to provide an index head equipped for very much finer and more minute predetermined adjustments and settings of the work, than has heretofore been possible. I attain this object by associating and combining with an index head mechanism which may be of the usual character, an additional actuating and controlling device adapted for adjusting and setting the work spindle with a very much smaller predetermined and accurately gaged angular movement than has heretofore been possible. The foregoing and other objects and advantages of the invention will more fully appear from the following detailed description, and the distinctive features of novelty will be pointed out in the appended claims.

Referring to the drawings:

Figure 1 is a partial sectional view with certain elements in elevation showing an index head embodying the invention, and Fig. 2 is a partial sectional view approximately on line 2. 2 of Fig. 1.

10 indicates a portion of the frame work and housing of a metal working machine such as an ordinary milling machine or gear-cutter, and having journaled therein a work spindle 11. This spindle has keyed thereto a worm wheel 12 which is engaged by a worm 13 fixed on a shaft 14 journaled in the frame work transversely of the spindle. 15 indicates a plate that corresponds in position and mounting to the perforated index plate of an ordinary index head, but in the present combination performs a different function as will be set forth. This plate is shown as fixed on a sleeve 16 having a gear 17 thereon with which meshes another gear 18 journaled on the stud 19 set into the housing. This arrangement and mounting of the plate 15 with the sleeve 16 and gears 17, 18 is merely illustrative of the application of the invention to a well known type of index head wherein the gears 17, 18 are adapted to be connected to a train for turning the index plate constantly in operation as required for certain kinds of work as in cutting spirals,— this, however, constituting no part of the present invention. The plate 15 is in the present embodiment provided with a perforation 15ª engageable by a manually adjusted pin 20 on the housing for normally locking said plate against movement. In accordance with my invention the plate 15 has extended from the top of the front thereof lugs 21 which are extended to constitute spaced apart bearing brackets 22, 23 in which is journaled a shaft 24 having fixed thereon a single thread worm 25. The worm 25 meshes with a worm wheel 26 fixed on the shaft 14, this worm wheel thus occupying the position that the index arm coöperative with the index plate usually occupies in an index head.

The shaft 24 has fixed on a projecting end thereof for radial adjustment, an index arm 27 bearing at its outer end a movable index pin 28 adapted to be projected forward to fit into any one of a series of holes 29 in an index plate 30 fixed to a flange 22ª formed on the bearing 22. The index plate 30 may be provided with a multiple series of the holes 29 as is usual in index plates.

With the described construction it will be understood that exceedingly minute angular adjustments of the spindle may be obtained with precision and by absolutely predetermined amounts, the reduction obtained by the worm and worm wheel 12, 13 being multiplied by the worm and worm wheel 25, 26 and thus high number indexing to practically any required extent may be obtained, while still employing a range of movement of the index arm 27 sufficient so that the operator does not need to give any special, or more than ordinarily painstaking, attention thereto. I am aware that the invention may be embodied in other specific forms without departing from the spirit or essential attributes thereof, and I therefore desire the present embodiment to be considered in all respects as illustrative, reference being had to the appended claims rather than to the foregoing description to indicate the scope of the invention.

Having described my invention, what I claim as new and desire to secure by Letters Patent is:

1. The combination with a work spindle, of an indexing device therefor consisting in a worm wheel fixed on said spindle, a worm in mesh therewith, a shaft on which said worm is fixed having fixed on the outer end thereof a relatively large worm wheel, a plate mounted adjacent said second worm wheel equipped with a bearing projection overhanging said worm wheel, a second worm mounted in such bearing projection to engage said second worm, an index arm mounted to turn with said second worm, and a relatively fixed index plate associated therewith and mounted transversely of the second worm wheel.

2. The combination with a work spindle, of an indexing device therefor consisting in a worm wheel fixed to said spindle, a worm in mesh therewith, a second worm wheel mounted to turn with said worm, a second worm engaged with said second worm wheel, an index arm mounted to turn with said second worm, and an index plate bearing multiple series of holes coöperative with said index arm for the purpose stated.

In testimony whereof, I have signed my name to this specification.

JOHN R. BECKETT.